(12) United States Patent
Baert et al.

(10) Patent No.: US 9,745,758 B2
(45) Date of Patent: Aug. 29, 2017

(54) PANEL SUITABLE FOR ASSEMBLING A WATERPROOF FLOOR OR WALL COVERING, METHOD OF PRODUCING A PANEL

(71) Applicant: Champion Link International Corporation, The Valley (AI)

(72) Inventors: Thomas Luc Martine Baert, Sint-Martens-Latem (BE); Anthony Drevet, Jiaxing (CN); Tom Van Poyer, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

(21) Appl. No.: 14/856,590

(22) Filed: Sep. 17, 2015

(65) Prior Publication Data
US 2016/0083965 A1 Mar. 24, 2016

(30) Foreign Application Priority Data
Sep. 18, 2014 (NL) .................................... 2013486

(51) Int. Cl.
*E04F 15/10* (2006.01)
*E04F 15/02* (2006.01)
(Continued)

(52) U.S. Cl.
CPC ........ *E04F 15/107* (2013.01); *B29C 65/4805* (2013.01); *B29C 66/72327* (2013.01); *B29C 66/748* (2013.01); *E04F 13/0866* (2013.01); *E04F 13/0894* (2013.01); *E04F 13/18* (2013.01); *E04F 15/02038* (2013.01); *E04F 15/02188* (2013.01); *E04F 15/105* (2013.01); *E04F 15/206* (2013.01); *B29K 2027/06* (2013.01); *B29K 2105/04* (2013.01); *B29L 2009/00* (2013.01); *B29L 2031/732* (2013.01); *E04F 2201/0153* (2013.01)

(58) Field of Classification Search
CPC ... E04F 15/107; E04F 15/02038; E04F 13/16; E04F 13/0894; B29L 2009/005
See application file for complete search history.

(56) References Cited

U.S. PATENT DOCUMENTS 3,921,312 A   11/1975  Fuller
3,929,948 A * 12/1975  Welch ................ B29C 44/0461
                                              264/45.5

(Continued)

FOREIGN PATENT DOCUMENTS

CN    100419019 C    9/2008
DE    19933343 A1    2/2001
(Continued)

*Primary Examiner* — Paola Agudelo
(74) *Attorney, Agent, or Firm* — The Webb Law Firm

(57) ABSTRACT

The invention relates in a first aspect, to a panel suitable for assembling a waterproof floor or wall covering by interconnecting a plurality of said panels with each other, wherein the panel has a substantially planar top surface, and a substantially planar bottom surface, at least four substantially linear side edges comprising at least one pair of opposite side edges which are provided with interconnecting coupling means for interconnecting one panel within another. The invention also relates to a method of producing a panel according to the invention.

28 Claims, 3 Drawing Sheets

(51) Int. Cl.
    *E04F 13/08*    (2006.01)
    *B29C 65/48*    (2006.01)
    *B29C 65/00*    (2006.01)
    *E04F 13/18*    (2006.01)
    *E04F 15/20*    (2006.01)
    *B29K 27/06*    (2006.01)
    *B29K 105/04*   (2006.01)
    *B29L 9/00*     (2006.01)
    *B29L 31/00*    (2006.01)

(56) References Cited

U.S. PATENT DOCUMENTS

| | | | |
|---|---|---|---|
| 4,426,820 A | 1/1984 | Terbrack et al. | |
| 6,006,486 A | 12/1999 | Moriau et al. | |
| 6,440,538 B1 * | 8/2002 | Ungar | B32B 27/04 |
| | | | 428/143 |
| 6,490,836 B1 | 12/2002 | Moriau et al. | |
| 6,505,452 B1 | 1/2003 | Hannig et al. | |
| 6,591,568 B1 | 7/2003 | Palsson | |
| 6,688,061 B2 | 2/2004 | Garcia | |
| 6,769,219 B2 | 8/2004 | Schwitte et al. | |
| 6,874,292 B2 | 4/2005 | Moriau et al. | |
| 6,880,307 B2 | 4/2005 | Schwitte et al. | |
| 6,928,779 B2 | 8/2005 | Moriau et al. | |
| 6,955,020 B2 | 10/2005 | Moriau et al. | |
| 7,121,058 B2 | 10/2006 | Palsson et al. | |
| 7,617,651 B2 | 11/2009 | Grafenauer | |
| 7,654,054 B2 | 2/2010 | Moriau et al. | |
| 7,712,280 B2 | 5/2010 | Moriau et al. | |
| 7,757,453 B2 | 7/2010 | Moriau et al. | |
| 7,810,297 B2 | 10/2010 | Moriau et al. | |
| 7,874,119 B2 | 1/2011 | Pervan et al. | |
| 7,980,043 B2 | 7/2011 | Moebus | |
| 8,091,238 B2 | 1/2012 | Hannig | |
| 8,281,549 B2 | 10/2012 | Du | |
| 8,678,133 B2 * | 3/2014 | Clausi | B32B 25/14 |
| | | | 156/60 |
| 8,689,512 B2 | 4/2014 | Pervan | |
| 9,133,626 B2 * | 9/2015 | Song | B32B 3/26 |
| 2003/0093964 A1 | 5/2003 | Bushey et al. | |
| 2005/0028474 A1 | 2/2005 | Kim | |
| 2005/0183370 A1 | 8/2005 | Cripps | |
| 2008/0034701 A1 * | 2/2008 | Pervan | B27N 7/00 |
| | | | 52/588.1 |
| 2009/0126308 A1 | 5/2009 | Hannig et al. | |
| 2011/0296780 A1 * | 12/2011 | Windmoller | B32B 3/06 |
| | | | 52/309.1 |
| 2012/0276348 A1 * | 11/2012 | Clausi | B32B 29/002 |
| | | | 428/196 |
| 2013/0067842 A1 * | 3/2013 | Meersseman | B32B 7/12 |
| | | | 52/309.4 |
| 2014/0109507 A1 * | 4/2014 | Dossche | B32B 21/04 |
| | | | 52/588.1 |
| 2014/0227484 A1 * | 8/2014 | Sung | B32B 27/12 |
| | | | 428/147 |
| 2015/0343739 A1 * | 12/2015 | Pervan | E04F 15/107 |
| | | | 52/582.1 |
| 2015/0375471 A1 * | 12/2015 | Song | B32B 15/046 |
| | | | 428/159 |
| 2015/0375473 A1 * | 12/2015 | Miralles Torla | B32B 38/08 |
| | | | 428/220 |

FOREIGN PATENT DOCUMENTS

| | | |
|---|---|---|
| DE | 19944399 A1 | 4/2001 |
| DE | 202005004537 U1 | 6/2005 |
| DE | 102006011887 A1 | 7/2007 |
| EP | 1243721 A2 | 9/2002 |
| FR | 2826391 A1 | 12/2002 |
| WO | 0188306 A1 | 11/2001 |
| WO | 2007118352 A1 | 10/2007 |
| WO | 2011141851 A2 | 11/2011 |

* cited by examiner

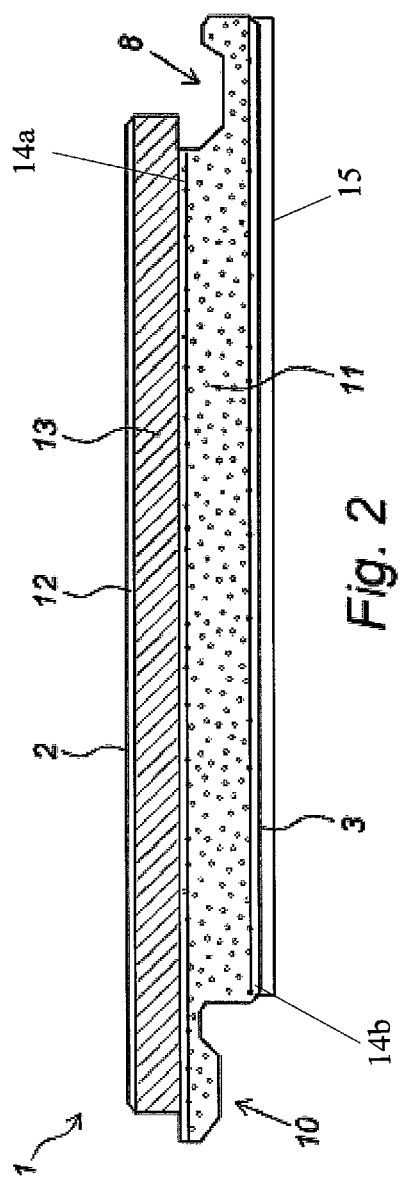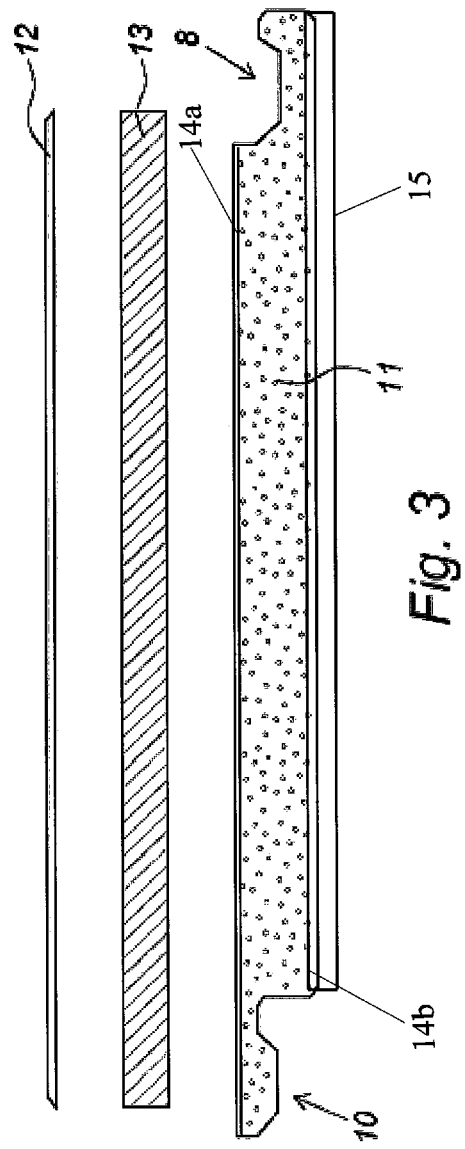

PANEL SUITABLE FOR ASSEMBLING A WATERPROOF FLOOR OR WALL COVERING, METHOD OF PRODUCING A PANEL

CROSS-REFERENCE TO RELATED APPLICATION

This application claims priority to Netherlands Patent Application No. 2013486 filed Sep. 18, 2014, the disclosure of which is hereby incorporated in its entirety by reference.

BACKGROUND OF THE INVENTION

Field of the Invention

The invention relates in a first aspect, to a panel suitable for assembling a waterproof floor or wall covering by interconnecting a plurality of said panels with each other, wherein the panel has a substantially planar top surface, and a substantially planar bottom surface, at least four substantially linear side edges comprising at least one pair of opposite side edges which are provided with interconnecting coupling means for interconnecting one panel within another. The invention also relates to a method of producing a panel according to the invention.

Description of Related Art

In the field of floor and wall coverings, panels are widely used based on wood materials or derivatives thereof, especially as a material for the main or core layer of the panel. An example is given in U.S. Pat. No. 6,688,061. A major disadvantage is the hygroscopic nature of such materials, which affects the lifetime and durability of such panels. As an alternative several thermoplastic materials such as polyvinyl chloride is used, which while being water resistant, present other disadvantages. Polyvinyl chloride that is used for panels such as in patent CN 100419019, has a flexible quality which requires a perfectly smooth and even surface of the substrate on which the panel covering is applied. If such is not the case, any unevenness will be visible through the panel as it conforms with the underlying substrate surface, which is a detrimental effect from an aesthetic point of view to the user. Furthermore, the upper surface of the panel is less durable because the scratch resistance of the polyvinyl chloride is relatively low. Finally, the flexibility of the panel is cumbersome in regard of installing a covering of interconnected panels, because the assembling of the mutual interconnecting coupling means is more difficult when these can bend away from each other.

In short, there is a general need in the field to develop a panel which while having waterproof properties, also is sufficiently rigid and resistant to wear and tear. In addition, the panel to be developed should be sufficiently light in weight.

It is an objective of the invention to meet the above general need, and thus take away completely or in part, one or more of the disadvantages related to the panels known from the prior art.

SUMMARY OF THE INVENTION

The above objective of the invention, is met by the provision of a panel according to the above preamble, wherein the panel has a sandwich structure which comprises a core layer basically composed of a thermoplastic material, a, preferably rigid, top layer and a reinforcing layer situated in between the core layer and the top layer, said reinforcing layer being substantially made of at least one thermoplastic material, and wherein preferably the core layer is provided with at least a part of the interconnecting coupling means.

The thermoplastic material for both the core layer and the reinforcing (sub)layer has waterproof properties and is not hygroscopic as such. The material contributes to the light weight of the panel. The rigid top layer and the reinforcing layer take away the disadvantages relating to flexible panels. Thermoplastic materials are ideally suitable to be applied in the panel according to the invention, such these materials are relatively cheap and moreover relatively easy to process. Application of the thermoplastic reinforcing layer underneath the rigid top layer leads to improved acoustic (sound absorbing) properties of the panel. Moreover, this thermoplastic reinforcing layer leads to an improved impact resistance of the panel.

Typically, the panel has a square or rectangular shape. The overall rigidity of the panel is preferably 35 and 45 N/mm2 according to the test method described in the European norm EN-310.

Preferably the panel according to the invention, comprises two pairs of opposite side edges which are provided with interconnecting coupling means. As such a 'floating' covering can be assembled by interconnecting the individual panels with each other at all four sides without the need of further coupling means such as adhesives.

It is further preferred in the panel according to the invention, that the interconnecting coupling means comprise a tongue and a groove wherein the tongue is provided on one side edge of one pair of opposite side edges, and the groove is provided on the other side edge of the same pair of opposite side edges. Such a design of coupling means is well-known in the art and has proven highly suitable for panels for floating floors.

In the panel according to the invention it is preferred that the interconnecting coupling means have an interlocking feature which avoids free movement (play) of interconnected panels. Such an interlocking feature may be a projection and a respective recess provided on the respective opposite side edges by which neighbouring panels interlock with each other.

It is preferred in the panel according to the invention that the thermoplastic material of the core layer and/or the reinforcing layer comprises polyvinyl chloride (PVC) and/or polyethylene (PE) and/or acrylonitrile butadiene styrene (ABS). These materials have proven highly suitable for its use as main component for the core layer. Most preferably PVC is used, because PVC is relatively soft while having a high degree of impact noise dampening.

In particular, it is preferred in the panel according to the invention that the at least a part of the thermoplastic material of the core layer has a foam structure. The foam structure consists basically of a thermoplastic matrix in which closed and/or open cells are present. The foam structure is typically obtained by adding blowing agents (foaming agents) to the thermoplastic melt, before it is formed and hardened into its final shape. As the foam structure has a lower density than a solid structure, the weight of the core layer is further reduced which is advantageous for the panel. The foam structure has furthermore the inherent property of better sound dampening properties than a solid structure, which provides a further attractive property to the panel. Preferably, at a top surface and/or a bottom surface of the core layer form(s) a crust layer. More preferably, both the top surface and the bottom surface of the core layer form a crust layer enclosing the foam structure. The crust layer is a relatively closed (free of bubbles (cells)), and hence relatively rigid layer, compared to the more porous foam structure. Commonly, though not necessary, the crust layer is formed by sealing (searing) the bottom and top surface of the core layer. Preferably the thickness of each crust layer is between 0.01 and 1 mm, preferably between 0.1 and 0.8 mm. Too thick crust will lead to a higher average density of the core layer which increases both the costs and the rigidity of the core layer. The thickness of the core layer as such is preferably between 2 and 10 mm, more preferably between 3 and 8 mm.

In a preferred embodiment, hardness of the reinforcing layer is between 30 and 90 Shore (D), preferably between 50 and 80 Shore (D), more preferably between 60 and 70 Shore (D). Hence, the rigidity of the reinforcing layer is preferably medium hard. The thermoplastic material of the reinforcing layer is preferably a high density thermoplastic. To this end, the density of the reinforcing layer is preferably between 1000 and 2000 kg/m$^3$, preferably between 1400- and 1900 kg/m$^3$, and more preferably between 1400-1700 kg/m$^3$.

The thickness of the reinforcing layer is preferably smaller than the thickness of the core layer which is commonly the thickest layer. The thickness of the reinforcing layer is preferably situated between 0.2 and 2 mm, preferably between 0.55 and 1 mm.

In a preferred embodiment, the reinforcing layer is directly—without intermediate layers—attached to the core layer. This direct attachment can be realized, for example, by welding both layers to each other. Preferably, the core layer and the reinforcing layer are made of substantially the same thermoplastic material, preferably PVC. This will significantly facilitate the welding process to attach the layers to each other. Welding the layers onto each other could be very favourable, since a tight connection between both layers could be realized in a very easy and inexpensive manner. In case an adhesive is used to attach the core layer to the reinforcing layer, then preferably a solvent cement, more preferably a PVC solvent cement, is used. Solvent cement welds thermoplastic layers by softening the surface of the material being bonded. Unlike gluing, which hardens to hold material together, the material softened by this substance trades molecules to form a solvent welded joint that has the strength of the parent material. Primers and proper preparation allow the solvent to form a bond without contamination from grease, inks and oils.

Eventually, the panel comprises a substantially rigid bottom layer (if applied) attached to a bottom surface of the core layer (facing away from the reinforcing layer). The bottom layer (if applied) can provide additional rigidity to the panel, if desired.

In a preferred embodiment of the panel according to the invention, the rigid top layer and/or the rigid bottom layer (if applied) each comprise at least one ply of a cellulose-based layer and a cured resin. Such a ply has proven to be sufficiently rigid and impact resistant for its function in the invention. Furthermore, such a ply has suitable waterproof properties. With particular preference, the cellulose-based layer in the panel according to the invention is paper. The paper used is preferably regular paper. As an alternative Kraft paper may be used although it offers less rigidity to the ply.

Advantageously, the cured resin in the panel according to the invention comprises a melamine resin and/or a phenolic resin. Melamine is preferably used because it offers more rigidity to the ply.

It is preferred in the panel according to the invention that the rigid top layer and/or the rigid bottom layer (if applied) comprise more than one ply of a cellulose-based layer and a cured resin. The rigidity of the panel envisaged can be adapted in this way, as a larger number of plies contributes to a higher rigidity.

With special preference in the panel according to the invention, the rigid top layer comprises seen from the upper surface of the panel, a first and second ply of a cellulose-based layer and a cured resin, wherein the cellulose-based layer of the second ply has a decorative surface. As such, the panel is provided with the required surface properties of a decorative pattern or colour, as well as an impact resistant top surface.

In the panel according to the invention, preferably the rigid top layer comprises seen from the upper surface of the panel, a third and fourth ply of a cellulose-based layer and a cured resin, wherein the cellulose-based layer of the third and fourth ply each contain fibres oriented in a main direction, wherein the main direction of the cellulose-based layer of the third ply differs from the main direction of the cellulose-based layer of the fourth ply, preferably by an angle in the range of 45 to 135 degrees, more preferably in the range of 80 to 100 degrees. The third and fourth ply contribute additional rigidity, not only by their additional number, but also because their main direction of fibres is different. Moreover, the third and fourth ply offer additional impact strength to the top layer.

With further preference in the panel according to the invention, the plies of the rigid top layer and/or the plies of the rigid bottom layer (if applied) form a laminated structure (multilayer structure) which is obtained by lamination under high pressure. Such a laminated structure has a higher impact and scratch resistance than a normal laminate.

Typically, the lamination process involves a pressure of 10 to 18 MPa under which at least two plies of a cellulose-based layer impregnated with resin are laminated. Advantageously, the lamination process is performed at a temperature between 150 and 180° C. Under such circumstances, the curing may be completed within 30 to 120 seconds.

This makes it possible to use a common short cycle press in the process, whereas conventional high pressure lamination (HPL) processes require a lower temperature, from about 120 to about 150° C. and a longer pressing time, from 30 min to 45 min, and consequently require the use of a multilayer daylight press.

It is conceivable that the panel comprises one or more additional layers between the core layer and the top layer, and preferably between the reinforcing thermoplastic layer and the top layer. This additional layer can also have a reinforcing functionality and/or stabilizing functionality. Preferably, the additional layer is formed by a fibre reinforced layer which may be formed by a fibreglass layer to give the panel more rigidity.

Preferably in the panel according to the invention, the core layer is an extruded sheet material. Such a layer is easily produced, and the extrusion process is suitable for the formation of a sheet having a foam structure.

It is further preferred in the panel according to the invention, that the core layer is provided on its top side and on its bottom side with an adhesive layer, which preferably comprises a waterproof adhesive. In the process of producing the sandwich structure of the panel, the rigid bottom and top layer are expediently fixed on the core layer, by an adhesive layer. In regard of the envisaged waterproof properties of the panel, a waterproof adhesive is preferably used.

In another preferred embodiment of the panel according to the invention, the first ply of the rigid top layer contains abrasion resistant particles, and/or its top surface is provided with a relief pattern. Both features contribute to the intended use of the panel for a floor or wall covering.

Especially when the top layer is produced by the above lamination process, a single press machine can be used which makes it cost efficient to use a press plate with matching embossing for each decorative pattern in order to obtain a relief pattern on the top surface of the panel that matches the decorative pattern.

As an alternative to the above features, the rigid bottom layer (if applied) of the panel according to the invention, comprises a ply basically composed of a polyvinyl chloride or of a non-woven fabric. Dependent on the specific configuration of the top layer, such a bottom layer (if applied) may be sufficient for the intended use. For the bottom layer it is also possible to use a regular HPL sheet (High Pressure Laminate sheet). The rigidity is lower but HPL is easily available and relatively inexpensive.

It is preferred in the panel according to the invention, that the core layer basically is composed of a thermoplastic material which contains one or more filler materials chosen from the group comprising calcium carbonate, wood dust, bamboo dust, rubber, cork, straw, fibres, in particular fibreglass, and paper, wherein preferably the total ratio of filler material in the core layer is 30 wt. % or lower. The filler material imparts rigidity to the core layer.

Preferably, in the panel according to the invention, the rigid bottom layer (if applied) is provided on its bottom side with a cushioning layer of one or more materials chosen from the group comprising cork, rubber, a solid foam material, polyethylene and ethylene vinyl acetate. The cushioning layer may compensate further for any unevenness on the substrate surface on which the panels are applied. Furthermore, the cushioning layer attributes a sound dampening effect to the panel.

With further preference, in the panel according to the invention, the rigid top layer is provided on its bottom side with a buffer layer of one or more materials chosen from the group comprising cork, rubber, a solid foam material, polyethylene and ethylene vinyl acetate. The buffer layer imparts some shock absorbing qualities to the panel in case of a heavy impact on the top surface of the panel. Furthermore, the buffer layer attributes a sound dampening effect to the panel.

A special aspect of the invention relates to a waterproof floor or wall covering composed of a plurality of interconnected panels, wherein the panels are conform the first aspect of the invention. Such a covering profits from the same advantages as set out already above.

The invention also relates to a method of producing a panel according to the invention, comprising the steps of: A) providing a core layer basically composed of a thermoplastic material, preferably PVC, B) providing a reinforcing layer being substantially made of at least one thermoplastic material, preferably PVC, C) curing a top layer comprising at least two plies of a cellulose-based layer impregnated with resin, preferably under a pressure of 10 to 18 MPa, and D) stacking the layers together, wherein the reinforcing layer is situated in between the core layer and the top layer. The method according to the invention provides a new and expedient way to provide an improved panel according to the invention.

Preferably the curing in step B) is performed at a temperature between 150 and 180° C. Under such circumstances, the curing may be completed within 30 to 120 seconds, preferably between 60 and 70 seconds.

In the method according to the invention, preferably at least two plies of the top layer contain a cellulose-based layer impregnated with at least 70 to 130 wt. % resin. Such an amount of resin relative to the cellulose-based layer, has proven effective in achieving the advantageous properties of the top layer of the panel. With particular preference, the first ply of the top layer contains a cellulose-based layer impregnated with an increased amount of resin, which is 150 to 250 wt. %.

Furthermore, in the method according to the invention, preferably the cellulose-based layers of two plies of the top layer contain fibres oriented in a main direction, wherein the main direction of the cellulose-based layer of one ply differs from the main direction of the cellulose-based layer of the other ply, preferably by an angle in the range of 45 to 135 degrees, more preferably in the range of 80 to 100 degrees.

Preferably during step A), the core layer is provided a foamed structure, which is more preferably enclosed by a crust layer or substantially closed layer at the bottom region and top region of the core layer.

The following dimensions and properties are preferred for the panel according to the invention:
overall thickness of the panel: 3-8 mm
thickness of the rigid top and bottom layer (if applied) approx. 0.4-0.8 mm
thickness of the core layer approx. 3-7 mm
thickness of the reinforcing thermoplastic layer approx. 0.5-2 mm
overall width of the panel: 120-600 mm
overall length of the panel: 300-2500 mm In respect of the core layer of polyvinyl chloride with a foam structure the following properties are preferred:
pore size: 0.01 to 0.15 mm
pore volume: 20-50%
density: 650-900 kg/m3
inherent viscosity: 0.6 to 0.84

BRIEF DESCRIPTION OF THE DRAWINGS

The invention will be further explained with reference to the appended non-limitative figures wherein:

FIG. 2 shows a schematic cross-section in longitudinal direction of a panel according to the present invention;

FIG. 3 shows an exploded view of a panel according to the present invention.

DETAILED DESCRIPTION OF THE PREFERRED EMBODIMENTS

Figure 1:
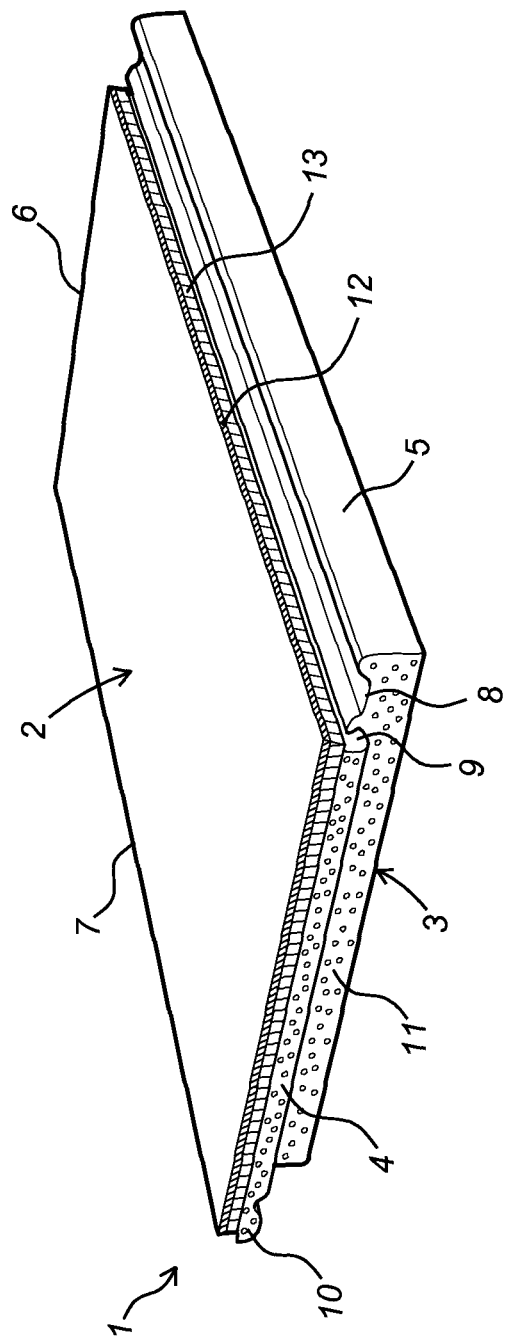
FIG. 1 shows a schematic view of a panel according to the present invention.

FIG. 1 shows a panel (1) suitable for assembling a waterproof floor or wall covering by interconnecting a plurality of said panels (1) with each other. The panel (1) has a substantially planar top surface (2), and a substantially planar bottom surface (3), at least four substantially linear side edges (4, 5, 6, 7) of which at least one pair (5 and 7, 4 and 6) of opposite side edges (4, 5, 6, 7) which are provided with interconnecting coupling means (8, 9, 10) for interconnecting one panel (1) within another. The panel (1) has a sandwich structure which comprises a core layer (11) basically composed of a thermoplastic material, a rigid top layer (12) and a reinforcing layer (13) situated in between the core layer (11) and the top layer (12), said reinforcing layer (13) being substantially made of at least one thermoplastic material. The interconnecting coupling means (8, 10) comprise a tongue (10) on one (5) of the opposite sides (4, 5, 6, 7) and a groove (8) on the other side (7) of the opposite sides (4, 5, 6, 7), which lock two panels (1) when the tongue (10) interlocks the groove (8).

FIG. 2 shows a schematic cross-section in longitudinal direction of the panel (1) according to FIG. 1, and shows the sandwich structure of the panel (1), comprising the core layer (11) basically composed of a thermoplastic material, the rigid top layer (12) and the reinforcing layer (13) situated in between the core layer (11) and the top layer (12), said reinforcing layer (13) being substantially made of at least one thermoplastic material.

The core layer (11) and the reinforcing layer (13) are preferably made of the same thermoplastic material, which for instance is PVC. The core layer (11) may be a PVC foam layer (11), whereas the reinforcing layer (13) is a solid PVC layer (13). Preferably, at a top surface and/or a bottom surface of the core layer form(s) a crust layer (14a, 14b). More preferably, both the top surface and the bottom surface of the core layer form a crust layer (14a, 14b) enclosing the foam structure. Eventually, the panel comprises a substantially rigid bottom layer (15) (if applied) attached to a bottom surface of the core layer (11) (facing away from the reinforcing layer (13)). The bottom layer (15) (if applied) can provide additional rigidity to the panel, if desired.

The reinforcing layer (13) preferably has a density between 1000-2000 kg/m3, preferably between 1400-1900 kg/m3, specifically between 1400-1700 kg/m3. The hardness of the later lies between 30-90 Shore, preferably between 50-80 Shore and specifically between 60-70 Shore.

FIG. 3 shows an exploded view of a panel according to FIGS. 1 and 2, with a core layer (11) and a top layer (12) which sandwich a reinforcing layer (13). The top layer (12) and the reinforcing layer (13) are connected to each other by an (not shown) adhesive. The core layer (11) is provided with interconnecting coupling means in the form of a tongue (10) and a groove (8).

Figure 4:
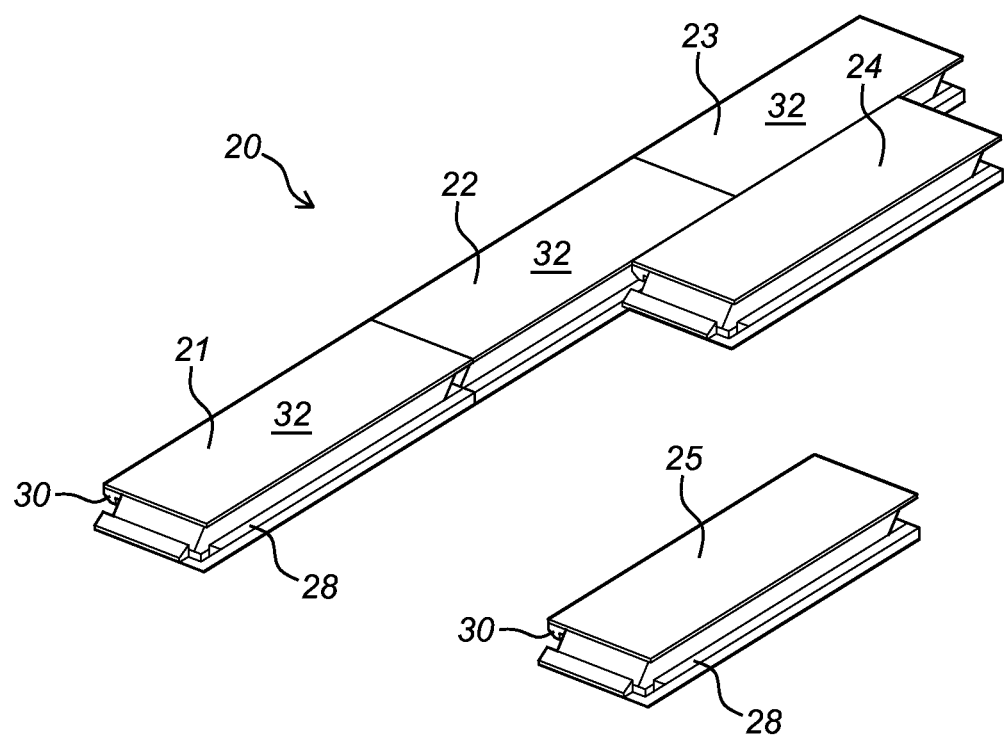
FIG. 4 shows schematically a floor covering according to the present invention.

FIG. 4 shows schematically a floor covering (20) in which four panels (21, 22, 23, 24) are interconnected and a fifth panel (25) is ready to be interconnected with two other panels (21, 22). The panels (21, 22, 23, 24) are interconnected through their coupling means (28, 30) in the form of a tongue (30) and a groove (28) and provide for a connection free of play. The top surfaces (32) of the placed panels (21, 22, 23, 24) together forms the walking surface of the floor covering (20).

It will be apparent that the invention is not limited to the exemplary embodiments shown and described here, but that within the scope of the appended claims numerous variants are possible which will be self-evident to the skilled person in the field.

The invention claimed is:

1. A panel suitable for assembling a waterproof floor or wall covering by interconnecting a plurality of said panels with each other,
    wherein the panel has a substantially planar top surface, and a substantially planar bottom surface, at least four substantially linear side edges of which at least one pair of opposite side edges which are provided with interconnecting coupling means for interconnecting one panel within another, the panel having a sandwich structure which comprises a core layer composed of at least a thermoplastic material, a rigid top layer and a reinforcing layer situated in between the core layer and the top layer, said reinforcing layer being substantially made of at least one thermoplastic material, wherein the core layer is provided with at least a part of the interconnecting coupling means, wherein the panel has an overall rigidity between 35 and 45 N/mm$^2$, and wherein the rigid top layer comprises at least two plies of cellulose-based layer and a cured resin.

2. The panel according to claim 1, comprising two pairs of opposite side edges which are provided with interconnecting coupling means.

3. The panel according to claim 1, wherein the interconnecting coupling means comprise a tongue and a groove wherein the tongue is provided on one side edge of one pair of opposite side edges, and the groove is provided on the other side edge of the same pair of opposite side edges.

4. The panel according to claim 1, wherein the interconnecting coupling means have an interlocking feature which substantially avoids play between interconnected panels.

5. The panel according to claim 1, wherein the core layer and the reinforcing layer are made of substantially the same thermoplastic material.

6. The panel according to claim 1, wherein the thermoplastic material of the core layer comprises polyvinyl chloride (PVC) and/or polyethylene (PE) and/or acrylonitrile butadiene styrene (ABS).

7. The panel according to claim 1, wherein the thermoplastic material of the reinforcing layer comprises polyvinyl chloride (PVC) and/or polyethylene (PE).

8. The panel according to claim 1, wherein at least a part of the thermoplastic material of the core layer has a foam structure.

9. The panel according to claim 8, wherein the thermoplastic material both at a top surface and a bottom surface of the core layer forms a crust layer enclosing the foam structure.

10. The panel according to claim 9, wherein the thickness of each crust layer is between 0.01 and 1 mm.

11. The panel according to claim 1, wherein the thickness of the core layer is between 2 and 20 mm.

12. The panel according to claim 1, wherein the reinforcing layer is a hard layer.

13. The panel according to claim 1, wherein the hardness of the reinforcing layer is between 30 and 90 Shore D.

14. The panel according to claim 1, wherein the thermoplastic material of the reinforcing layer is a high density thermoplastic.

15. The panel according to claim 14, wherein the density of the reinforcing layer is between 1000 and 2000 kg/m$^3$.

16. The panel according to claim 1, wherein the thickness of the reinforcing layer is between 0.2 and 2 mm.

17. The panel according to claim 1, wherein the reinforcing layer is directly attached to the core layer.

18. The panel according to claim 17, wherein the reinforcing layer is welded to the core layer.

19. The panel according to claim 1, wherein the reinforcing layer is attached to the core layer by an adhesive.

20. The panel according to claim 1, wherein the cellulose-based layer is paper.

21. The panel according to claim 1, wherein the cured resin comprises a melamine resin and/or a phenolic resin.

22. The panel according to claim 1, wherein the panel comprises a rigid bottom layer attached to a bottom surface of the core layer.

23. The panel according to claim 22, plies of the rigid top layer and/or plies of the rigid bottom layer form a laminate which is obtained by lamination under high pressure.

24. The panel according to claim 1, wherein the rigid top layer comprises seen from the upper surface of the panel, a first and second ply of cellulose-based layer and a cured resin, wherein the cellulose-based layer of the second ply has a decorative surface.

25. The panel according to claim 24, wherein the rigid top layer comprises seen from the upper surface of the panel, a third and fourth ply of cellulose-based layer and a cured resin, wherein the cellulose-based layer of the third ply contains fibres oriented in a first main direction, wherein the cellulose-based layer of the fourth ply contains fibres oriented in a second main direction, wherein the first main direction of the cellulose-based layer of the third ply differs from the second main direction of the cellulose-based layer of the fourth ply by an angle in the range of 45 to 135 degrees.

26. The panel according to claim 1, wherein the first ply of the rigid top layer contains abrasion resistant particles, and/or its top surface is provided with a relief pattern.

27. The panel according to claim 1, wherein the core layer basically composed of a thermoplastic material contains one or more filler materials chosen from the group comprising calcium carbonate, wood dust, bamboo dust, rubber, cork, straw, fibres, fiberglass, and paper.

28. A waterproof floor or wall covering composed of a plurality of interconnected panels according to claim 1.

\* \* \* \* \*